US008200358B2

(12) United States Patent
Sendelbach et al.

(10) Patent No.: US 8,200,358 B2
(45) Date of Patent: Jun. 12, 2012

(54) HARD DRIVE TEMPERATURE CONTROL

(75) Inventors: Eric Neil Sendelbach, Austin, TX (US);
Matt Tavasoli, Austin, TX (US); Travis Christian North, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 722 days.

(21) Appl. No.: 12/277,341

(22) Filed: Nov. 25, 2008

(65) Prior Publication Data

US 2010/0128387 A1      May 27, 2010

(51) Int. Cl.
*G06F 19/00* (2011.01)
(52) U.S. Cl. .................................. 700/153; 700/205
(58) Field of Classification Search .................. 700/153, 700/202, 205
See application file for complete search history.

(56) References Cited

U.S. PATENT DOCUMENTS

| | | | | |
|---|---|---|---|---|
| 5,664,118 A * | 9/1997 | Nishigaki et al. | 710/304 |
| 5,930,110 A * | 7/1999 | Nishigaki et al. | 361/679.43 |
| 6,029,119 A * | 2/2000 | Atkinson | 702/132 |
| 6,421,354 B1 | 7/2002 | Godlewski | |
| 6,463,396 B1 * | 10/2002 | Nishigaki | 702/132 |
| 6,505,099 B1 * | 1/2003 | Brice et al. | 700/277 |
| 6,701,273 B2 * | 3/2004 | Nishigaki et al. | 702/132 |
| 6,856,139 B2 * | 2/2005 | Rijken et al. | 324/537 |
| 6,952,659 B2 * | 10/2005 | King et al. | 702/186 |
| 6,980,427 B2 * | 12/2005 | Garnett et al. | 361/679.38 |
| 6,993,418 B2 * | 1/2006 | Stewart | 700/299 |
| 7,032,037 B2 * | 4/2006 | Garnett et al. | 710/2 |
| 7,148,589 B2 * | 12/2006 | Nishigaki et al. | 307/413 |
| 7,225,235 B2 * | 5/2007 | Garnett et al. | 709/217 |
| 7,245,632 B2 * | 7/2007 | Heffernan et al. | 370/465 |
| 7,400,945 B2 * | 7/2008 | Radhakrishnan et al. | 700/299 |
| 7,480,542 B2 * | 1/2009 | Kroeger et al. | 700/202 |
| 7,647,134 B2 * | 1/2010 | Khadem Sameni | 700/202 |
| 7,831,323 B2 * | 11/2010 | Weber et al. | 700/96 |
| 2002/0183973 A1 * | 12/2002 | Nishigaki et al. | 702/186 |
| 2003/0031187 A1 * | 2/2003 | Heffernan et al. | 370/400 |
| 2003/0033361 A1 * | 2/2003 | Garnett et al. | 709/203 |
| 2003/0033362 A1 * | 2/2003 | King et al. | 709/203 |
| 2003/0048614 A1 * | 3/2003 | Garnett et al. | 361/724 |
| 2003/0105903 A1 * | 6/2003 | Garnett et al. | 710/300 |
| 2003/0154004 A1 * | 8/2003 | Kroeger et al. | 700/272 |
| 2003/0191889 A1 * | 10/2003 | Forrer, Jr. | 711/112 |
| 2004/0078711 A1 * | 4/2004 | King et al. | 714/43 |
| 2004/0150933 A1 * | 8/2004 | Nishigaki et al. | 361/103 |
| 2007/0214375 A1 * | 9/2007 | Burton | 713/320 |

* cited by examiner

*Primary Examiner* — Albert Decady
*Assistant Examiner* — Anthony Whittington
(74) *Attorney, Agent, or Firm* — Haynes and Boone, LLP

(57) ABSTRACT

A Hard Disk Drive (HDD) temperature control system includes an HDD including a temperature sensor. An Operating System (OS) driver is coupled to the temperature sensor and includes a temperature data retrieval engine that is operable to retrieve HDD temperature data from the temperature sensor and transmit the HDD temperature data. A shared data storage is coupled to the OS driver and operable to store the HDD temperature data transmitted from the temperature data retrieval engine. A fan speed controller is coupled to the shared data storage and operable to use the HDD temperature data stored in the shared data storage to adjust the speed of a fan.

20 Claims, 4 Drawing Sheets

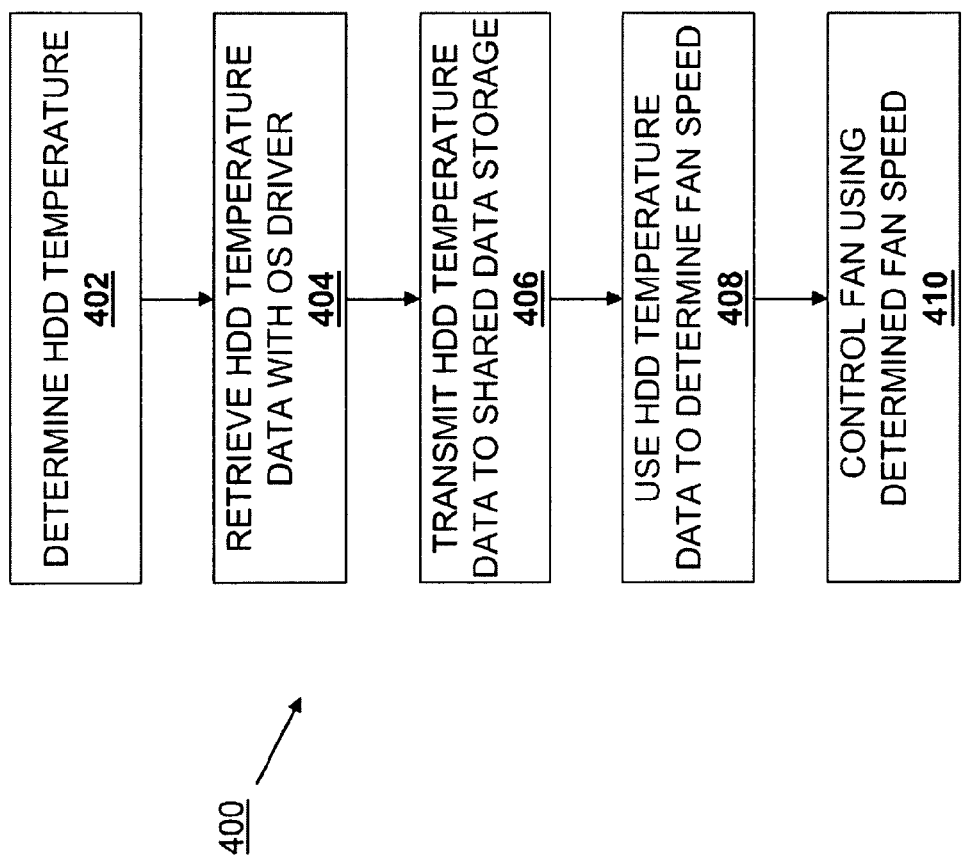

HARD DRIVE TEMPERATURE CONTROL

BACKGROUND

The present disclosure relates generally to information handling systems, and more particularly to controlling the temperature of a hard drive in an information handling system.

As the value and use of information continues to increase, individuals and businesses seek additional ways to process and store information. One option is an information handling system (IHS). An IHS generally processes, compiles, stores, and/or communicates information or data for business, personal or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

As IHSs increase in performance, the cooling needs of the IHS increase as well. Some components of the IHS, such as the hard disk drive (HDD), provide a number of challenges with regards to their cooling. HDDs come in a variety of capacities, speeds, and designs, all of which effect their thermal performance and acoustics. For many IHSs such as, for example, desktop IHSs, the HDD is the dominant thermal component in the system and has the largest effect on the IHS acoustics during idle. When the IHS is developed, the thermal curves to cool the IHS components are calibrated for the worst case scenario to ensure that for any configuration of the IHS, the components will be cooled. This unnecessarily burdens the cost and acoustics of the system when, for example, the IHS is capable of housing an HDD that requires more cooling than the HDD that the IHS actually houses. In that situation, the fan speed controllers will be calibrated to provide more cooling than is necessary for the HDD, resulting in, for example, poor acoustical performance when the IHS is idling.

Accordingly, it would be desirable to provide an improved hard drive temperature control absent the disadvantages discussed above.

SUMMARY

According to one embodiment, an HDD temperature control system includes an HDD comprising a temperature sensor, an Operating System (OS) driver coupled to the temperature sensor and comprising a temperature data retrieval engine that is operable to retrieve HDD temperature data from the temperature sensor and transmit the HDD temperature data, a shared data storage coupled to the OS driver and operable to store the HDD temperature data transmitted from the temperature data retrieval engine, and a fan speed controller coupled to the shared data storage and operable to use the HDD temperature data stored in the shared data storage to adjust the speed of a fan.

BRIEF DESCRIPTION OF THE DRAWINGS

FIG. 4 is a flow chart illustrating an embodiment of a method for controlling a temperature in an HDD.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a CPU or hardware or software control logic. Additional components of the IHS may include one or more storage devices, one or more communications ports for communicating with external devices as well as various I/O devices, such as a keyboard, a mouse, and a video display. The IHS may also include one or more buses operable to transmit communications between the various hardware components.

Figure 1:
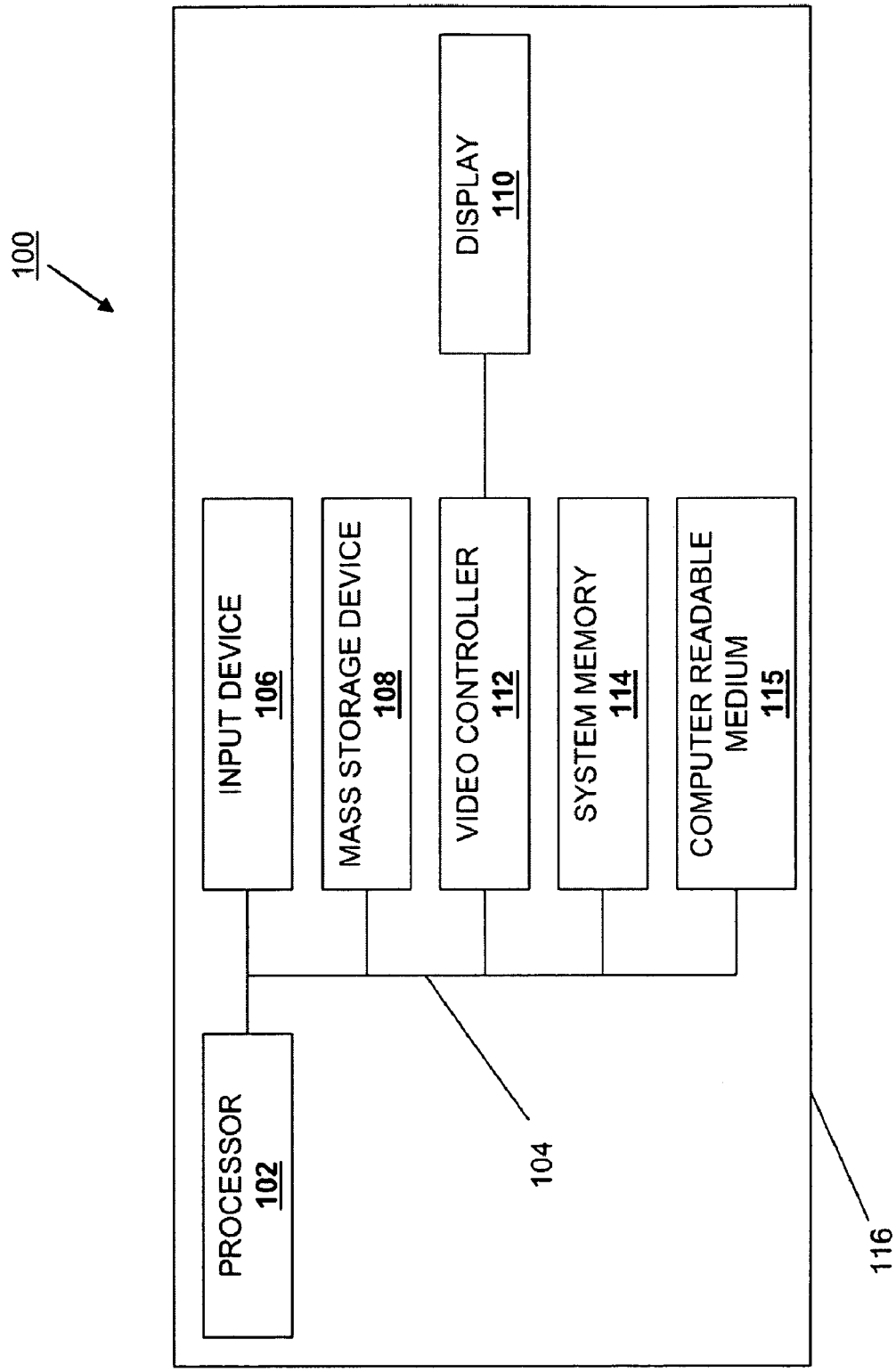
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. A computer-readable medium 115 is coupled to the processor 102 and may include the mass storage device 108, the system memory 114, and/or a variety of other computer-readable mediums known in the art. The computer-readable medium 115 stores (e.g., encodes, records, or embodies) computer-executable instructions/functional descriptive material (e.g., including but not limited to software (also referred to as computer programs or applications) or data structures). Such functional descriptive material imparts functionality when encoded on the computer-readable medium 115. For example, the processor 102 may read (e.g., access or copy) such functional descriptive material from the computer-readable medium 115 onto the system memory 114, and the processor 102 may then perform operations in response to such material. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
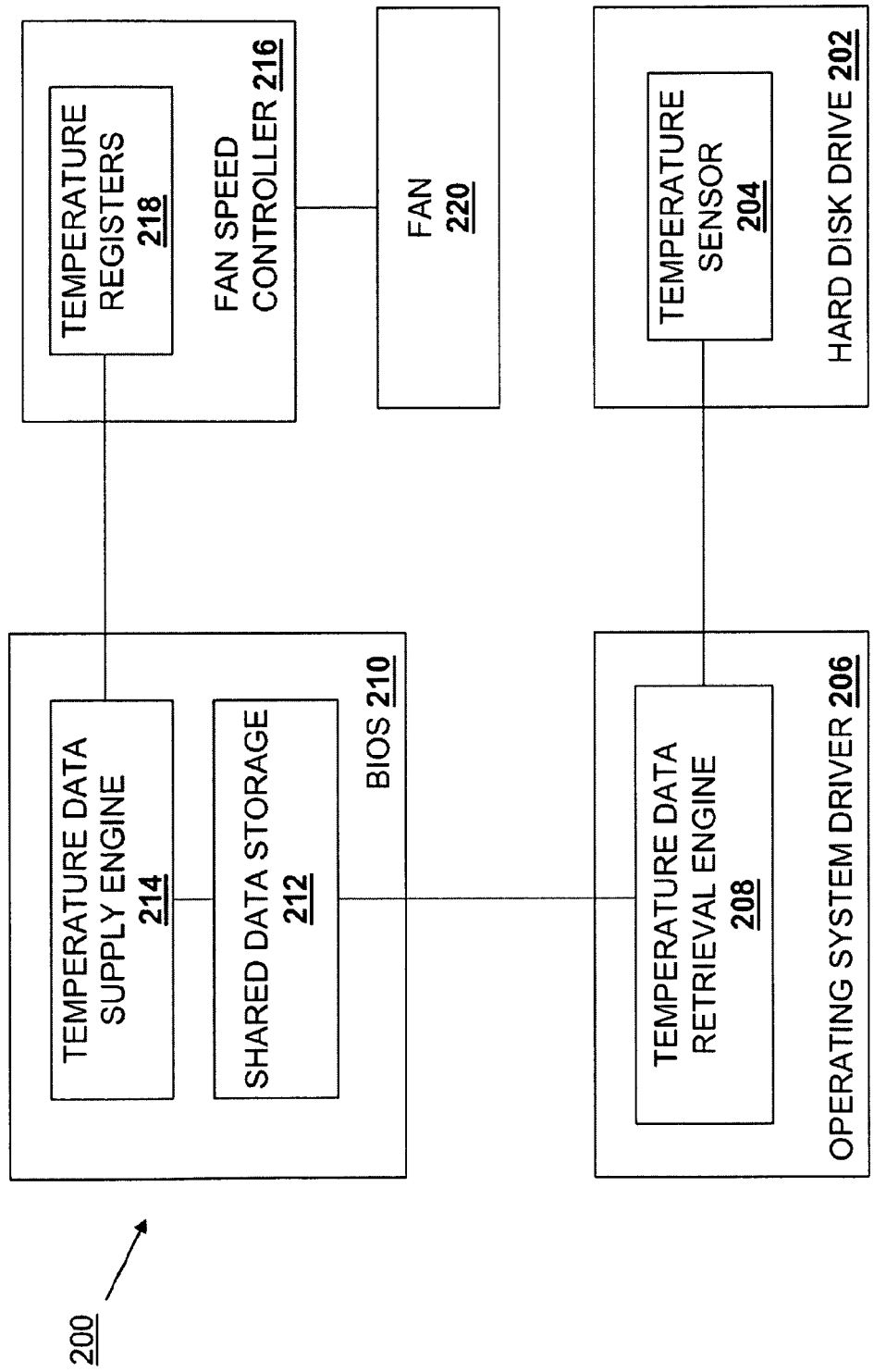
FIG. 2 is a schematic view illustrating an embodiment of an HDD temperature control system.

Referring now to FIGS. 1 and 2, an HDD temperature control system 200 is illustrated. In an embodiment, the HDD temperature control system 200 may be including in the IHS 100, described above with reference to FIG. 1. The examples provided below indicate where the components of the HDD temperature control system 200 may be included in the IHS 100. However, such examples are not meant to be limiting, and one of skill in the art will recognize the variety of ways the HDD temperature control system 200 may be included in the IHS 100. The HDD temperature control system 200 includes an HDD 202 including a temperature sensor 204. In an embodiment, the HDD 202 may be the mass storage device 108 and/or the computer-readable medium 115 in the IHS 100. An OS driver 206 includes a temperature data retrieval engine 208 that is coupled to the temperature sensor 204 in the HDD 202. In an embodiment, the OS driver 206 and/or the temperature data retrieval engine 208 may be included on the computer-readable medium 115 in the IHS 100. In an embodiment, the OS driver 206 is a conventional OS driver known in the art, and the temperature data retrieval engine 208 is a software agent that has been, for example, added to the OS driver 206 or modified in the OS driver 206 to retrieve data from the temperature sensor 204 and transmit that data to other components in the HDD temperature control system 200. A Basic Input Output System (BIOS) 210 includes a shared data storage 212 that is coupled to the temperature data retrieval engine 208 and a temperature data supply engine 214 that is coupled to the shared data storage 212. In an embodiment, the BIOS 210 and/or the temperature data supply engine 214 may be included on the computer-readable medium 115 in the IHS 100. In an embodiment, the shared data storage 212 may be included in the mass storage device 108, the system memory 114, and/or the computer-readable medium 115 on the IHS 100. A fan speed controller 216 includes temperature registers 218 that are coupled to the temperature data supply engine 214, and a fan 220 is coupled to the fan speed controller 216. In an embodiment, the fan 220 and the HDD 202 are located in the chassis 116 of the IHS 100 such that the fan 220 is in fluid communication with the HDD 202 and fluid (e.g., air) moved by the fan 220 flows immediately adjacent the HDD 202.

Figure 3:
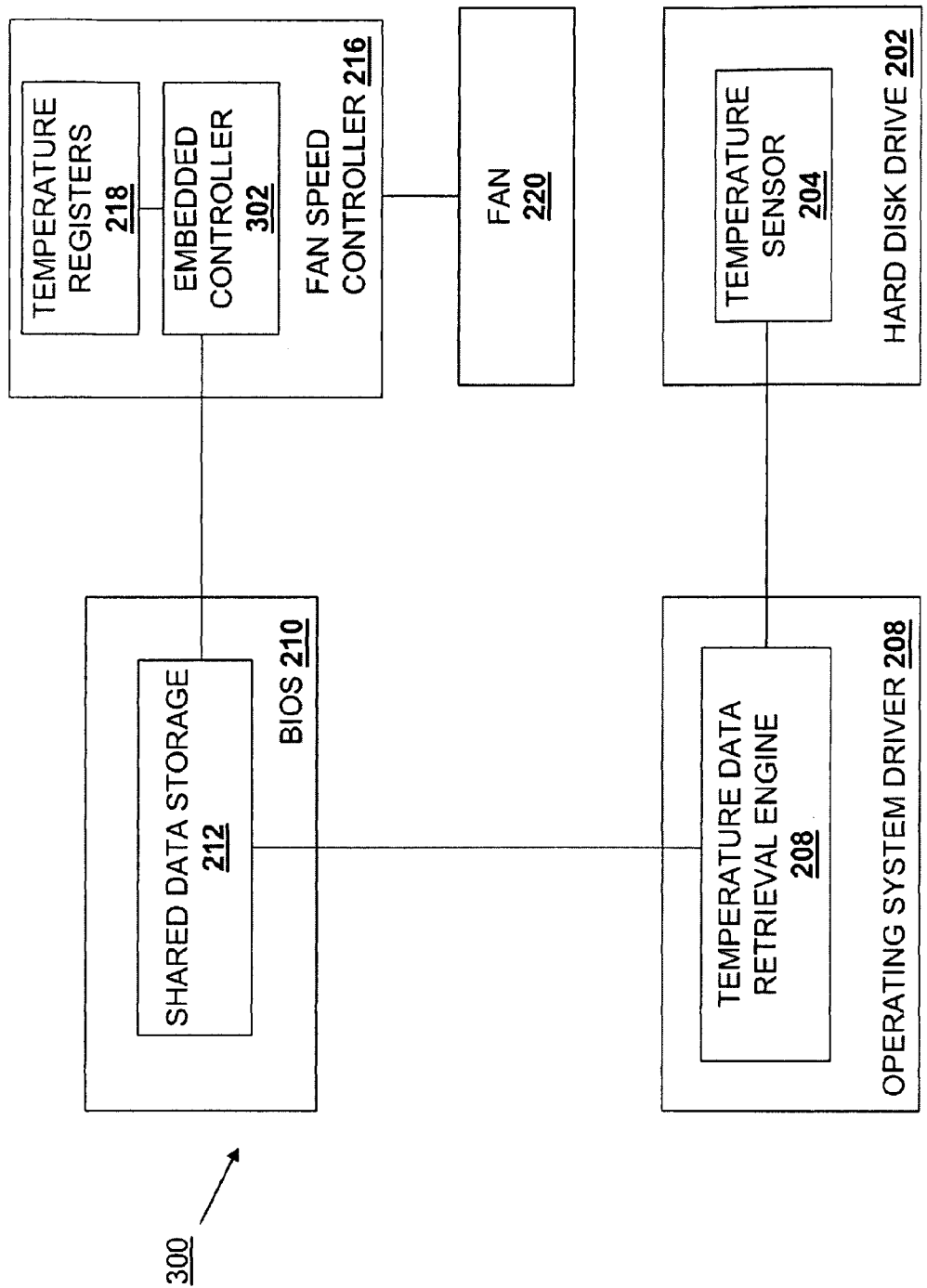
FIG. 3 is a schematic view illustrating an embodiment of an HDD temperature control system.

Referring now to FIG. 3, an embodiment of an HDD temperature control system 300 is illustrated that is substantially similar in structure and operation to the HDD temperature control system 200, described above with reference to FIG. 2, but with the removal of the temperature data supply engine 214 from the BIOS 210, and the provision of an embedded controller 302 in the fan speed controller 216. The embedded controller 302 is coupled to the shared data storage 212 in the BIOS 210 and to the temperature registers 218 in the fan speed controller 216.

Referring now to FIGS. 1, 2, 3 and 4, a method 400 to control the temperature of an HDD is illustrated. The method 400 begins at block 402 where an HDD temperature is determined. The temperature sensor 204 in the HDD 202 determines a temperature of the HDD 202 and creates HDD temperature data that corresponds to the determined temperature. In an embodiment, the temperature of the HDD 202 includes an internal temperature, an external temperature, and/or a variety of other temperatures known in the art. The method 400 then proceeds to block 404 where HDD temperature data is retrieved with the OS driver. The temperature data retrieval engine 208 accesses the temperature sensor 204 and retrieves the HDD temperature data created in block 402 of the method 400. The method 400 then proceeds to block 406 where the HDD temperature data is transmitted to a shared data space. The temperature data retrieval engine 208 transmits the HDD temperature data retrieved in block 404 of the method 400 to the shared data storage 212 in the BIOS 210. Conventionally, during IHS operation, HDD temperature data is only available to the OS driver, as it is only the OS driver that has access to the HDD during IHS operation. By using the temperature data retrieval engine 208 to transmit the HDD temperature data to the shared data storage 212, that HDD temperature data is now available to be read independent of the operation of the OS driver 206. For example, once the HDD temperature data has been transmitted to the shared data storage 212, multiple components of the IHS 100 such as, for example, an IHS management engine that may be located on the computer-readable medium 115, may access the shared data storage 212 and retrieve the HDD temperature data to, for example, provide the data to a user of the IHS 100 such that the user may monitor the temperature of the HDD 202.

The method 400 then proceeds to block 408 where the HDD temperature data is used to determine a fan speed. In an embodiment that uses the HDD temperature control system 200, the temperature data supply engine 214 in the BIOS 210 accesses the shared data storage 212, retrieves the HDD temperature data, and supplies the HDD temperature data to the temperature registers 218 in the fan speed controller 216. In an embodiment, the supplying of the HDD temperature data from the temperature data supply engine 214 to the fan speed controller 216 occurs periodically at predetermined intervals (e.g., once every minute.). However, the supplying of the HDD temperature data from the temperature data supply engine 214 to the fan speed controller 216 may occur continuously, based on an event occurring in the IHS 100, and or using a variety of other methods known in the art. The fan speed controller 216 may then use the HDD temperature data in the temperature registers 218 to determine a fan speed using methods known in the art. In an embodiment that uses the HDD temperature control system 300, the embedded controller 302 in the fan speed controller 216 accesses the shared data storage 212, retrieves the HDD temperature data, and supplies the HDD temperature data to the temperature registers 218 in the fan speed controller 216. The accessing of the shared data storage 212 and the retrieval of HDD temperature data my be accomplished by the embedded controller 302 without any interaction from the BIOS 210. The fan speed controller 216 may then use the HDD temperature data in the temperature registers 218 to determine a fan speed using methods known in the art. The method 400 then proceeds to block 410 where a fan is controlled using the determined fan speed. The fan speed controller 216 uses the fan speed determined in block 408 of the method 400 to control the speed of the fan 220 using methods known in the art. In an embodiment, the fan speed controller 216 may include sensors, feedback loops, and/or other fan control components known in the art to allow the fan speed determined in block 408 of the method 400 to be used to control the speed of the fan 220. In an embodiment, if the fan speed controller 216 determines (e.g., through the temperature data supply engine 214 or the embedded controller 302) that the shared data storage does not include the HDD temperature data, the fan speed controller 216 may access a default fan speed that is sufficient to cool the HDD 202 (e.g., sufficient to cool any size, speed, or capacity HDD that may be included in the IHS 100.) Thus, a system and method are provided that release the HDD temperature data from its ownership by the OS driver during IHS runtime in order to allow other components of the IHS to use the HDD temperature data independent of OS driver operation to, for example, control the fan speed of a fan that cools that HDD.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Hard Disk Drive (HDD) temperature control system, comprising:
    an HDD comprising a temperature sensor;
    an Operating System (OS) driver coupled to the temperature sensor and comprising a temperature data retrieval engine that is operable to retrieve HDD temperature data from the temperature sensor and transmit the HDD temperature data;
    a shared data storage coupled to the OS driver and operable to store the HDD temperature data transmitted from the temperature data retrieval engine; and
    a fan speed controller coupled to the shared data storage and operable to use the HDD temperature data stored in the shared data storage to adjust the speed of a fan.

2. The system of claim 1, wherein the shared data storage is located in a Basic Input Output System (BIOS).

3. The system of claim 2, wherein the BIOS comprises a temperature data supply engine that is operable to retrieve the HDD temperature data from the shared data storage and supply the HDD temperature data to the fan speed controller.

4. The system of claim 3, wherein the HDD temperature data is supplied to the fan speed controller periodically at predetermined intervals.

5. The system of claim 1, wherein the fan speed controller is operable to read the HDD temperature data stored on the shared data storage.

6. The system of claim 1, wherein the fan speed controller comprises a default fan speed that is sufficient to cool the HDD, wherein the fan speed controller is operable to use the default fan speed in response to determining that the shared data storage does not include the HDD temperature data.

7. The system of claim 1, further comprising:
    a fan coupled to the fan speed controller and in fluid communication with the HDD.

8. The system of claim 1, comprising:
    an IHS management engine coupled to the shared data storage and operable to retrieve the HDD temperature data from the shared data storage.

9. An information handling system (IHS), comprising:
    a chassis;
    a processor mounted in the chassis;
    a Hard Disk Drive (HDD) coupled to the processor and comprising a temperature sensor;
    a computer-readable medium coupled to the temperature sensor and comprising an Operating System (OS) driver, the OS driver comprising a temperature data retrieval engine that is operable to retrieve HDD temperature data from the temperature sensor and transmit the HDD temperature data;
    a shared data storage coupled to the computer-readable medium and operable to store the HDD temperature data transmitted from the temperature data retrieval engine; and
    a fan speed controller coupled to the shared data storage and operable to use the HDD temperature data stored in the shared data storage to adjust the speed of a fan.

10. The system of claim 9, wherein the shared data storage is located in a Basic Input Output System (BIOS).

11. The system of claim 10, wherein the BIOS comprises a temperature data supply engine that is operable to retrieve the HDD temperature data from the shared data storage and supply the HDD temperature data to the fan speed controller.

12. The system of claim 11, wherein the HDD temperature data is supplied to the fan speed controller periodically at predetermined intervals.

13. The system of claim 9, wherein the fan speed controller is operable to read the HDD temperature data stored on the shared data storage.

14. The system of claim 9, wherein the fan speed controller comprises a default fan speed that is sufficient to cool the HDD, wherein the fan speed controller is operable to use the default fan speed in response to determining that the shared data storage does not include the HDD temperature data.

15. The system of claim 9, further comprising:
    a fan coupled to the fan speed controller and in fluid communication with the HDD.

16. The system of claim 9, comprising:
    an IHS management engine coupled to the shared data storage and operable to retrieve the HDD temperature data from the shared data storage.

17. A method to control the temperature of a Hard Disk Drive (HDD), comprising:
    determining a temperature of an HDD;
    retrieving HDD temperature data that corresponds to the determined temperature of the HDD using a temperature data retrieval engine in an Operating System (OS) driver;
    transmitting the HDD temperature data to a shared data storage using the temperature data retrieval engine and storing the HDD temperature data in the shared data storage; and
    using the HDD temperature data stored in the shared data storage to determine a fan speed.

18. The method of claim 17, further comprising:
    sending the HDD temperature data stored in the shared data storage to the fan speed controller using a temperature data supply engine located in a Basic Input Output System (BIOS).

19. The method of claim 17, further comprising:
    retrieving the HDD temperature data stored in the shared data storage using the fan speed controller.

20. The method of claim 17, further comprising:
    using the determined fan speed to control a speed of a fan.

* * * * *